United States Patent [19]

Schmitz

[11] Patent Number: 5,230,272

[45] Date of Patent: Jul. 27, 1993

[54] HYDRAULIC POSITIONING DRIVE WITH PRESSURE AND POSITION FEEDBACK CONTROL

[75] Inventor: Jurgen Schmitz, Marktheidenfeld, Fed. Rep. of Germany

[73] Assignee: Mannesmann Rexroth GmbH, Lohr, Fed. Rep. of Germany

[21] Appl. No.: 657,240

[22] Filed: Feb. 28, 1991

Related U.S. Application Data

[63] Continuation-in-part of Ser. No. 371,736, Jun. 27, 1989, abandoned.

[30] Foreign Application Priority Data

Jun. 29, 1988 [DE] Fed. Rep. of Germany ....... 3821891

[51] Int. Cl.$^5$ ............................ F16D 33/00; F16D 31/02
[52] U.S. Cl. ................................. 91/361; 91/367; 91/459; 91/462
[58] Field of Search ................. 91/361, 459, 275, 367, 91/462, 433, 453, 363 R

[56] References Cited

U.S. PATENT DOCUMENTS

| | | | |
|---|---|---|---|
| 3,958,492 | 5/1976 | Curless | 91/462 X |
| 4,336,745 | 6/1982 | Lund | 91/361 X |
| 4,700,610 | 10/1987 | Bauer et al. | 91/390 |
| 4,712,470 | 12/1987 | Schmitz | 91/361 X |
| 4,817,498 | 4/1989 | Takagi | 91/361 |

Primary Examiner—Edward K. Look
Assistant Examiner—John Ryznic
Attorney, Agent, or Firm—Cushman, Darby & Cushman

[57] ABSTRACT

A hydraulic drive is actuated by a CNC means via an electrically actuable valve. The pressure applied to the hydraulic drive or the force excerted by the hydraulic drive is supplied in the form of a signal to a pressure control means or a force control means. The output signal of the pressure- or force control means is supplied via a switch means—shortly prior to reaching the desired position value of the drive—to the electrically operated valve as a control signal. Simultaneously, the output signal of the switch means, which can be supplied to the valve, is interrupted, wherein the switching range shortly prior to reaching the desired position value is smaller than the admissible differential value, determined by the CNC means, i.e. the differential value between each actually present desired position value and actual value, or, wherein, with the switch-over from the position control to the pressure- and force control, respectively, the desired position value signal supplied by the CNC means is brought to the value of the actual position value. Thus, the invention provides the possibility to switch the position control circuit over to a force control circuit or a pressure control circuit and back, without having to take the risk of an automatic switch off or disconnection of the drive.

10 Claims, 1 Drawing Sheet

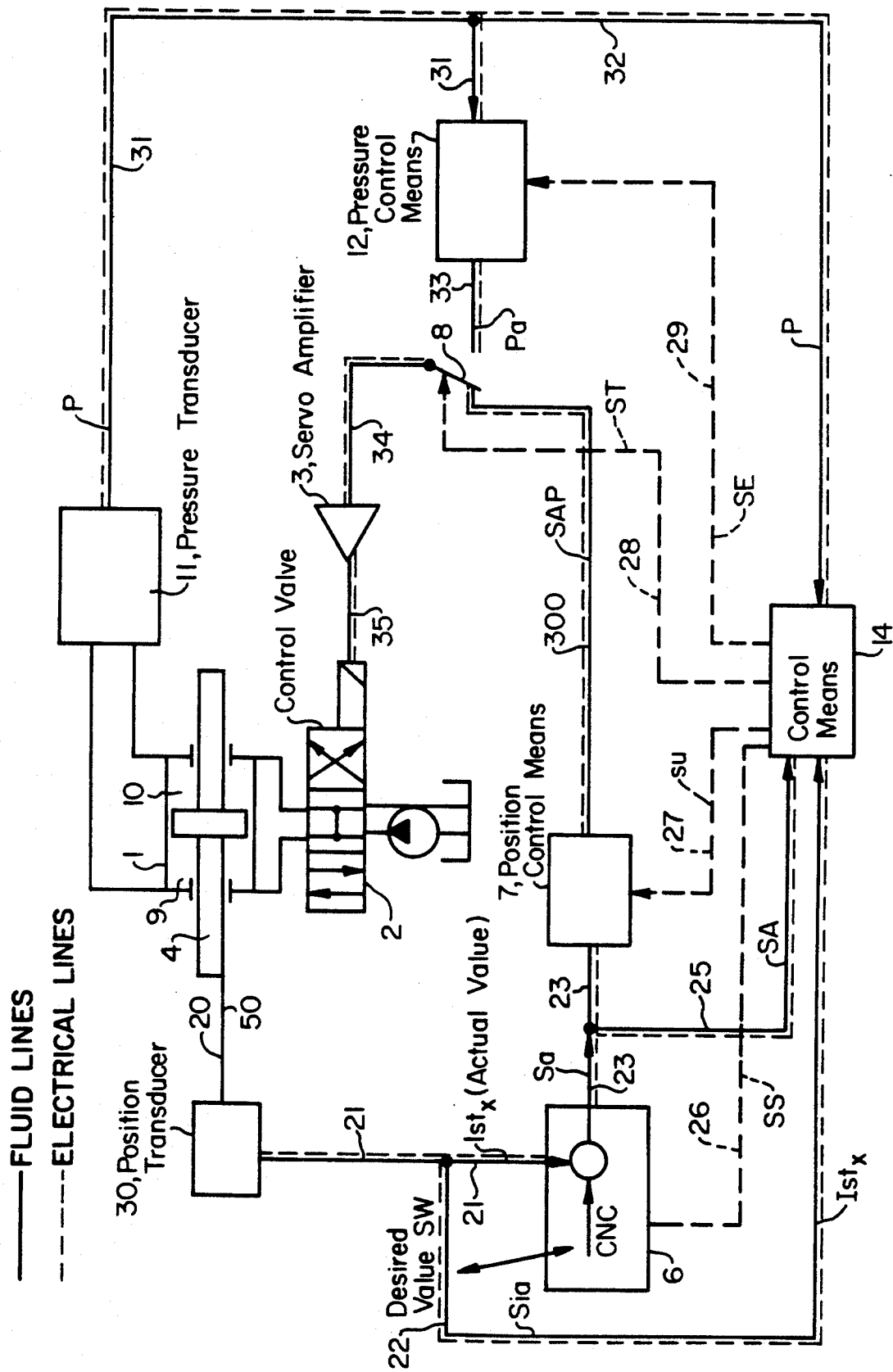

HYDRAULIC POSITIONING DRIVE WITH PRESSURE AND POSITION FEEDBACK CONTROL

This application is a continuation-in-part of my co-pending application Ser. No. 07/371,736, now abandoned.

DESCRIPTION

The invention relates generally to a CNC controlled (CNC=computerized numerical control) hydraulic positioning drive. The invention relates specifically to a hydraulic drive which is controlled by means of a CNC control means via an electrically actuated valve, wherein information about the actual position is supplied to the CNC control means in the form of a signal representing the actual value (actual value signal).

It is known that positioning drives comprise a hydraulic drive in the form of a cylinder or rotary motor, a control valve, a control means, the CNC, and the position transducer (position metering system).

Said known positioning drives are not suitable for a force or pressure control, inasmuch as the position control operation has to be shut off during a pressure control phase. The consequence will be an error report in the CNC control means which will eventually stop the drive.

It is an object of the present invention to provide means which will permit to switch between the position control circuit and a pressure control circuit respectively, and to switch back to a position control circuit, without encountering the risk of facing an automatic shut off of the drive, by the CNC.

In accordance with one aspect of the present invention a hydraulic drive is provided which is controlled by means of a CNC control means (CNC means) via an electrically actuable valve. Each position of the hydraulic drive is transmitted in the form of an acutal value signal to the CNC control. The pressure applied to the hydraulic drive, or the force exerted pressure applied to the hydraulic drive, or the force exerted by the hydraulic drive is transmitted to a pressure control means or a force control means. The output signal of said pressure- or force control means is supplied via a switch means, at a position shortly before reaching the desired position value of the drive means, to the electrically actuable valve as a control signal, while at the same time the output signal of the CNC means, which can be supplied to the valve, is interrupted by said switch means. The position, shortly before reaching the desired position value must be spaced from the desired position value by an amount smaller than the admissible differential value between each desired position value and each actual value, said differential value being determined (or designated) in said CNC means.

In accordance with another aspect of the invention a hydraulic drive means is provided having a CNC means which acts via an electrically operable valve for controlling said drive. Each position of the drive is supplied to the CNC means in the form of an actual value signal. The pressure applied to the hydraulic drive, or the force exerted by said hydraulic drive is supplied to the pressure- or force control means in the form of a signal. The output signal of said pressure or force control means can be supplied to the electrically actuable valve as a control signal via switch means, shortly prior to said drive means reaching said desired position value. At the same time the output signal of the CNC means, which can be supplied to the valve, is interrupted by said switch means. With the switch-over from the position control to the pressure- and force control, respectively, the desired position signal supplied from said CNC means is brought to the value of the actual position value.

The invention will now be described by reference to the drawing which discloses a hydraulic positioning drive of the invention.

In the drawing a CNC controlled hydraulic positioning drive is disclosed having a hydraulic cylinder 1, a piston and a piston rod 4 forming two piston chambers 9, 10. The piston rod 4 is connected via a mechanical coupling 20 to a position transducer 30. The position transducer 30 supplies an actual value signal $Ist_x$ i.e. an electrical position signal on a line 21 to a CNC control means (CNC means) 6. Said actual value signal $Ist_x$ is also supplied to a control means 14 via a line 22.

The CNC control means 6 contains a control means to which a desired signal SW is supplied by the (proper) CNC control and to which further the actual value signal $Ist_x$ is supplied. The CNC control means 6 supplies on line 23 an output or control signal (differential control signal) Sa to a position control means 7. Said differential control signal Sa is also supplied via a line 25 to the control 14.

The position control means 7 is connected at its output via a line 300 to a switch means 8 for supplying a control signal SAP to said switch means 8. Said control signal SAP is transmitted from the switch means 8—which is in its position shown in the FIG.—via a line 34 to a serve amplifier 3. The output of the servo amplifier 3 is connected via a line 35 to the control valve 2. The control signal SAP, which is amplified by the servo amplifier 3 is used for adjusting the control valve 2.

The switch means 8 can be switched from its shown position, the "position control position" into a not shown position, the "pressure or force control position". In the pressure control position (which can be called the pressure control mode) a force/pressure control means 12 is connected with its output via said switch means 8 to the servo amplifier 3 and thus to the control valve 2. The input of the pressure control means 12 is connected via a line 31 to a pressure transducer 11 so as to receive an output signal P therefrom. The pressure or force transducer 11 is in connection with both piston chambers 9, 10 and determines the pressure or pressure differential therein. The output of the pressure control means 12 can be connected via a line 33 with the switch means 8 and supplies if the switch means 8 is in its right or pressure control position—an output signal $P_a$ to the servo amplifier 3. The pressure transducer 11 supplies its output signal P also via a line 32 to the control means 14.

The control means 14 is connected via an information line 23 to the pressure control means 12 and supplies thereto a signal SE. The signal SE informs the pressure control means 12 about the time when it has to start its operation. The control means 14 is also connected via another information line 28 with the switch means 8 supplying to said switch means 8 a signal ST. Said signal ST is effective to cause the switching operation of the switch means 8 from its position control position into the pressure control position and vice versa. Via a line 27 the control means 14 is further connected with the position control means 7 so as to supply a signal SU thereto. Eventually, an information line 26 is provided between the control means 14 and the CNC control 6.

The CNC controlled hydraulic positioning drive as is shown in the FIGURE is designed in accordance with the invention such that it is possible to switch between the position control mode and the force/pressure control mode and vice versa without any difficulties and interruptions caused thereby.

With regard to the function of the positioning drive reference will be made to an example. For this purpose it is assumed that the piston rod 4 serves for instance to mount or clamp a piston ring, so that said piston ring can be machined in its clamped (fixedly mounted) position. Typically, a piston ring is fixedly mounted by exerting onto said piston ring a pressure of about 15 bar by said piston rod.

It will be assumed that the positioning drive starts its operation at a point in time referred to as "to". In said moment "to" the piston rod 4 is in a predetermined position and the position transducer 30 supplies an actual value signal $Ist_x$ corresponding to said position to the CNC control means 6 and also to the control means 14. Typically, at the time "to", the piston rod 4 is still far away from the desired clamping position. In case that this is so, there is no reason for the CNC control means 6 to start an incremental approach of the piston rod 4 towards said clamping position.

Indeed, the control means 14 defines intervals for which the control means 14 will not respond to pressure occurances reported on by the pressure transducer 11. Such pressure occurances can be generated for instance initially when starting the movement of the hydraulic drive.

Moreover, the CNC control means 6 provides for a so-called electronic cam which is in praxis a specific desired value.

After the so-called electronic cam has been exceeded, the CNC control means 6 starts to move along in a stepwise fashion along a ramp, so as to bring the piston rod 4 closer to the desired mounting position. For this purpose the CNC control means is supplied to the integrated control means predetermined desired value signals SW. Said desired value signals SW are provided in a time dependent manner. Moreover, the CNC control means 6 has information available with regard to the size of movement which has to be carried out at certain points in time. In case that at a certain point in time the required movement has not been provided, then this will lead to a switch-off operation for the CNC control means for reasons of safety.

During the ramplike approach towards the predetermined clamping position for the piston ring, the CNC control means 6 generates about every 10 milliseconds a new control signal SA based on the respective actual value signal and the respective desired value signal. Said differential control signal SA is supplied to the position control means 7. The position control means 7 generally amplifies said signal SA and provides further a compensation for a drift which occurs in the control valve 2 as well as the hydraulic drive, i.e. the hydraulic cylinder 1. The differential control signal SA is processed by said position control means 7 and a correlated signal SAP is supplied via line 300 to the switch means 8 and the servo amplifier 3 as well as the control valve 2 so as to provide the respective adjustment of said valve 2.

Stated somewhat more specifically, the desired value SW is a function of the location and is fed to the summing point which is shown by a circle in the CNC control means 6 of the drawing. Said desired value, which is the result of the programmed sequence, is compared with the actual value and results in the differential control signal Sa. The desired values, as mentioned, will generally take the form of a ramp, with the steepness of the ramp being the speed. However, in reality, the CNC control means 6 can naturally not provide a ramp inasmuch as said control means 6 operates only discretely in increments. In contrast thereto an analog control circuit would provide a real ramp. However, for the CNC control means such a ramp deteriorates to a step function. For all practical purposes, in the case of a CNC control means the ramp has the form of a "fine" step function with the time spacings being in the order of magnitude of 4 to 10 milliseconds.

For a moment the function of the position control means 7 as a drift compensator will be discussed. Existing valves and hydraulic cylinders are subject to drifts. As a consequence, the differential control signal Sa does not need to be amplified only by the position control means 7: At the same time it is necessary to provide a compensation for drifts. This is done by the position control means 7 for instance in the moment where the drive formed by the hydraulic cylinder 1 is stationary. In that moment the differential control signal exiting from the CNC control means 6 has to be O. In case that this is not so, the position control means 7 will automatically compensate said drift error.

Continuing now with the consideration of the movement of the piston rod towards the piston ring (generally an obstacle) it is noted that the CNC control means 6 does not provide for an analog processing of the control operation, but small increments of time exist during which practically nothing occurs. At the beginning and at the end of each increment the CNC control means 6 does calculations. In case that the piston ring or the obstacle occurs immediately after such a calculation is done during the subsequent increment (of for instance 10 milliseconds) the pressure will greatly increase. This increase can be so high that the obstacle, for instance the piston ring may be deformed or destroyed.

At this time, the pressure transducer 11 and the control means 14 come into action. The control means 14 recognizes the obstacle in real time and effects the immediate switching of the switch means 8 so that now the force/pressure control means 31 takes over the control of the clamping operation of the obstacle or piston ring. Simultaneously, the invention provides that the control means 14 sends a signal SS via line 26 to the CNC control means 6 and causes the same to assume a mode of operation for which it stops the operation.

As was mentioned before the CNC control means 6 always continuously checks at the end of an increment whether the actual value is where it actually should be. In case the actual value is not where it should be then the CNC control means 6 concludes that a malfunction exists and automatically causes an emergency switch-off operation. Said emergency switch-off operation is useful in the case of position control, because damages are avoided. However, under actual operating conditions a problem exists insofar as it cannot be said precisely in advance where an obstacle (i.e. a piston ring, which can have different thickness tolerances) will occur. For instance, the obstacle could occur in one situation at a metering point 70, in another situation it could occur at a metering point 69 and in still another situation it could occur at the metering point 72. This depends, as was mentioned, what the thickness dimension of the piston rings is.

The exact point of the obstacle is not known in advance. Hence it is not known up to which point the CNC control means 6 has to "run" the above mentioned emergency switch-off without the connection 26 of the invention between the control means 14 and the CNC control means 6. For said reason the CNC control means 6 is put in the above mentioned mode of operation which can be called the "follow" mode, i.e. the CNC control means 6 is instructed to maintain the last desired value. At the same time the CNC control means 6 supplies on line 23 a differential control signal SA which now remains at the value 0.

Thus, the sign of the differential control signal supplied to the control means 14 via line 25 does not change. For example the sign is considered to be positive when the movement occurs towards the mounting position.

Simultaneously, the control means 14 supplies via line 27 a signal SU to the position control means 7, preventing said position control means 7 from changing its drift compensation (which is not necessary at that time).

The force/pressure control means 12 was already informed via the information line 29 and the signal SE by the control means 14 to initiate its operation and consequently said control means 12 will run through its control program and clamp the piston ring with about 50 bar, while the movement as such occurs with 10 bar.

At the end of the control operation provided by the force/pressure control means 12 the piston ring remains clamped by about 50 bar and, thereupon, the machining of the piston ring can be carried out for instance by a grinding machine. After said grinding operation is finished the piston ring has to be released from its clamped position. This means, that again a switching operation is necessary, however, this time from the force control mode to the position control mode. The information necessary for this switching operation is contained in the program of the CNC control means 6. The CNC control means 6 has information about, for instance, when the grinding operation is finished.

For this purpose the CNC control means 6 is returned to its normal operation from the "follow" mode, i.e. the desired value which was maintained prior to the first switching operation will now be again compared with the actual value signal. This will now lead to a (for example) negative differential control signal when moving away from the obstacle or piston ring. This flipping of the sign of the differential control signal Sa is immediately determined by the control means 14 via line 25 and based on said information the control means 14 will switch the switch means 8 back to the position shown in the FIGURE, i.e. the position control mode. The desired value now continues to precede the actual value up until the desired opening position is reached.

The present invention provides, in particular together with a CNC control means, the possibility of a position control mode as well as of a force control mode with the respective switching operation between said two modes of operation. The invention avoids the undesired transfer of the CNC control means 6 into the emergency stop mode. This is done by providing means which determine the moment when the switching occurs from the position control mode to the pressure control mode. Further, means are provided which make sure that the CNC control means 6 is instantaneously stopped when the switching moment has been reached. This is done essentially by the control means 14 which acts via line 26 onto the CNC control means 6.

The invention may be summarized as follows: A positioning drive in the form of a hydraulic cylinder 1 is controlled by a servo amplifier 3 via a control valve 2. The electric position signal Si is supplied in the form of the actual value signal Istx by position transducer 30 to the CNC means 6, and is there compared with the desired value signal. The output signal Sa of the CNC means 6 is supplied to a position control means 7 and from there via a switch means 8 to the servo amplifier 3.

The cylinder chambers 9 and 10 of the hydraulic cylinder 1 are connected with an electric pressure transducer 11. The output signal P thereof is supplied to a pressure control means 12. The output signal Pa of the pressure control means 12 is supplied via said switch means 8 to the servo amplifier 3 and thus to the control valve 2, as soon as the switch means interrupts the connection between the position control means 7 and the servo amplifier 3 and establishes the connection between the pressure control means 12 and the servo amplifier 3.

The actual value signal Istx representing the position of the piston rod 4 of the working cylinder 1 is supplied not only to the CNC means, but also to the control means 14. Moreover, the control means 14 receives the output signal P of the pressure transducer 11 which is supplied to the pressure control means 12. Moreover, the control means 14 is supplied with the output signal Sa of the CNC means 6. As soon as the signal Sa has a predetermined (positive or negative) sign, the actual position value signal exceeds a predetermined value, and a predetermined pressure increase is reported via the pressure transducer 11 to the control means 14, the control means provides the switch means 8 with the switching signal for switching over from the position control to the pressure control. During said switch-over the CNC means 6 remains fully effective.

As soon as the signal Sa, supplied from the CNC control 6 to the control means 14, changes its sign, the control means 14 will again actuate said switch means 8, and said switch means 8 is switched back into the shown switch position for position control.

As soon as the switch-over from the position control to pressure control has occurred by means of the switch means 8, a signal is simultaneously supplied to the CNC means 6 by said control means 14. Consequently, the actual (i.e. just present) desired position value of the CNC means 6 is maintained in the CNC means 6, or is transferred into the actual position value so as to avoid a switch-off of the CNC means 6. Moreover, the position control means 7 as well as the pressure control means 12 receive control signals from the control means 14, control signals which will activate, depending on the control operation, the one or the other control means.

From the above explanations the following is clear: For a hydraulic drive, actuated by a CNC means 6 via an electrically actuable valve 2, the pressure applied to the hydraulic drive or the force excerted by the hydraulic drive is supplied in the form of a signal to a pressure control means or a force control means. The output signal of the pressure or force control means is supplied via a switch means 8—shortly prior to reaching the desired position value of the drive—to the electrically operated valve 2 as a control signal, and, simultaneously, the output signal of the switch means 8, which is suppliable to the valve 2, is interrupted, wherein the switching range shortly prior to reaching the desired position value is smaller than the admissible differential value, determined by the CNC means, i.e. the differential value between each actually present desired position value and actual value, or, wherein, with the switch-over from the position control to the pressure- and force control, respectively, the desired position value signal supplied by the CNC means is brought to the value of the actual position value. Thus, the invention provides the possibility to switch the position control circuit over to a force control circuit or a pressure control circuit and back, without having to be afraid of an automatic switch off or disconnection of the drive.

I claim:

1. A hydraulic drive controllable by a valve which is electrically actuable comprising:
   computerized numerical control means, receiving each actual position of the hydraulic drive as an actual value signal, for producing an output signal indicative of a difference between the actual position and a desired position,
   pressure/force control means, receiving a signal representative of one of a pressure applied to the hydraulic drive or a force exerted by the hydraulic drive, and producing an output signal of said pressure/force control means,
   switch means receiving said output signal of said pressure/force control means and said output signal of said computerized numerical control means, for supplying said output of said pressure/force control means shortly before reaching the desired position value of the drive to the electrically actuable valve as a control signal, and simultaneously therewith, interrupting the output signal, which can be supplied from the computerized numerical control means to the valve, whereby a switch over from control based on said output signal of said computerized numerical control means to control based on said output signal of said pressure/force control means of the desired position value signal supplied by the computerized numerical control means is brought to a value indicative of said actual position value.

2. The hydraulic drive controlled by a computerized numerical control control as set forth in claim 1 wherein the control means is in addition supplied with the output signal of said computerized numerical control means and is responsive to a change of the sign of the output signal (Sa) of the computerized numerical control means the control means is switched back due to a renewed switching of the switch means from the pressure control to the position control.

3. The hydraulic drive controlled by a CNC control as set forth in claim 1 wherein the switch over from the position control to the pressure control and force control, respectively, requires in addition a predetermined pressure increase and force increase, respectively.

4. The hydraulic drive controlled by a CNC control as set forth in claim 1, wherein the control means (14) reports the switch over from position control to to pressure control and force control, respectively, to the CNC control (6) by means of a signal.

5. A computerized numerical controlled hydraulic positioning drive comprising:
   a hydraulic drive,
   a position transducer connected with said hydraulic drive to supply an actual value signal indicating an actual position of the hydraulic drive,
   a control valve, connected with said hydraulic drive to adjust said drive in accordance with an input signal,
   a computerized numerical control means connected with said position transducer for producing an output signal to control the control valve,
   a pressure control means for producing an output signal which controls the control valve,
   a switching means for applying to the control valve either the output signal of the computerized numerical control means or the output signal of the pressure control means depending on a state of said switching means, and
   control means for controlling switching of the switch means into either a position control mode or a pressure control mode, the control means receiving information about pressure conditions in the hydraulic drive and switching the switching means responsive to information indicating that a predetermined pressure has been reached, the control means simultaneously controlling the pressure controller to initiate its predetermined control operation, and simultaneously controlling the computerized numerical control means to stop position control operation presently under way and to supply a differential control signal "zero", thus avoiding an automatic shut-off of the computerized numerical control control means.

6. A controlled hydraulic drive comprising:
   a computerized numerical control means, receiving each actual position of the drive as an actual value signal; for producing an output controlling signal based on said actual position and a desired position;
   pressure control means, receiving a signal indicative of a pressure of the hydraulic drive, for producing a pressure output signal based thereon;
   an electrically actuable valve operative to actuate said hydraulic drive;
   a switch having inputs receiving said output controlling signal and said pressure output signal, and an output connected to said electrically actuable valve; and
   control means for controlling said switch means to actuate it between a first position connecting the computerized numerical control means to said valve and a second position connecting said pressure control means to said valve, said control means commanding said pressure output signal of said pressure control means to be supplied to the electrically actuable valve as a control signal via said switch means at a position shortly before reaching the desired position of the drive, while simultaneously interrupting the output signal of the computerized numerical control means supplied to the valve by the switch means, and wherein said position shortly before reaching the desired position is smaller than an admissible differential value between each desired position value and said actual value.

7. The hydraulic drive controlled by a CNC control as set forth in claim 6 wherein the control means is additionally supplied with the output signal of the computerized numerical control means, and is responsive to a change of the sign of the output signal of the computerized numerical control means 1, wherein the control means is switched back due to a renewed switching of the switch means from the pressure control to the position control.

8. The hydraulic drive controlled by a CNC control as set forth in claim 6, wherein the switch over from the position control to the pressure control and force control, respectively, requires in addition a predetermined pressure increase and force increase, respectively.

9. The hydraulic drive controlled by a CNC control as set forth in claim 6, wherein the control means (14) reports to the control (6) by means of a signal the occurence of the switch over from the position control to the pressure control and force control, respectively,.

10. The positioning drive of claim 6 wherein the CNC control means (6) is connected with a position control means (7) which in turn is connected with the switching means (8), wherein the position control means (7) is further connected with the control means (14) so as to maintain the position control means (7) at a predetermined drift compensation when the pressure dependent switch-off of the CNC control means occurs, so that the switching operation from the pressure control mode to the position control mode is again available.

* * * * *